(12) United States Patent
Schwab (10) Patent No.: US 11,465,565 B1
(45) Date of Patent: Oct. 11, 2022

(54) TRUCK AND AUTOMOTIVE CAB STORAGE BOX

(71) Applicant: Dual Fuel Systems, Inc., Batavia, IL (US)

(72) Inventor: Eric Fischer Schwab, Batavia, IL (US)

(73) Assignee: Dual Fuel Systems, Inc., Batavia, IL (US)

(*) Notice: Subject to any disclaimer, the term of this patent is extended or adjusted under 35 U.S.C. 154(b) by 66 days.

(21) Appl. No.: 16/997,064

(22) Filed: Aug. 19, 2020

Related U.S. Application Data (60) Provisional application No. 62/888,639, filed on Aug. 19, 2019.

(51) Int. Cl.
| | |
|---|---|
| *B60R 7/02* | (2006.01) |
| *B60R 7/04* | (2006.01) |
| *B60R 5/02* | (2006.01) |

(52) U.S. Cl.
CPC .............. *B60R 7/02* (2013.01); *B60R 5/02* (2013.01); *B60R 7/04* (2013.01)

(58) Field of Classification Search
CPC .. B60R 5/02; B60R 5/04; B60R 5/044; B60R 7/02; B60R 7/04; B60R 7/043
USPC .................... 296/37.1, 37.6, 37.16
See application file for complete search history.

(56) References Cited

U.S. PATENT DOCUMENTS

| | | | | |
|---|---|---|---|---|
| 5,829,655 A * | 11/1998 | Salopek | .......... | B60R 7/02 217/15 |
| 6,669,259 B2 * | 12/2003 | Murray | .......... | B60R 21/026 296/24.46 |
| D485,801 S | 1/2004 | Smith | | |
| D540,738 S | 4/2007 | Hatch | | |
| D582,190 S | 12/2008 | Valiulis et al. | | |
| 8,651,351 B2 * | 2/2014 | Fowler | .......... | B60R 7/08 224/543 |
| D901,371 S | 11/2020 | Besley | | |
| D913,198 S | 3/2021 | Sethapun et al. | | |
| D916,647 S | 4/2021 | Chen | | |
| D922,934 S | 6/2021 | Sanders | | |
| D922,935 S | 6/2021 | Guo | | |
| D927,403 S | 8/2021 | Park et al. | | |
| D931,186 S | 9/2021 | Ye | | |
| D934,152 S | 10/2021 | Lai | | |
| D935,381 S | 11/2021 | Chen | | |
| D938,892 S | 12/2021 | Lai | | |

(Continued)

OTHER PUBLICATIONS

Truck Office; www.truckoffice.com/products/cargodeck/; as existed Jul. 16, 2018; retrieved via the Internet Archive Wayback Machine on Feb. 24, 2022 (Year: 2018).*

*Primary Examiner* — Jason S Daniels (74) *Attorney, Agent, or Firm* — Brie A. Crawford; Crawford Intellectual Property Law LLC (57) ABSTRACT

A truck and automotive cab storage box is placed in the back seat of the cab of a work truck or other vehicle. The truck and automotive cab storage box has a tray which is connected to an angled cover and a divider separates the tray into two sections. The truck and automotive cab storage box stores items and forces users to stop the vehicle and open the rear doors to access items in or underneath the tray. The angled cover makes it difficult or impractical to store items on top of the truck and automotive cab storage box. The truck and automotive cab storage box makes it difficult or impractical to store items around it.

5 Claims, 10 Drawing Sheets

(56) References Cited

U.S. PATENT DOCUMENTS

| | | | | |
|---|---|---|---|---|
| 2004/0251704 A1* | 12/2004 | Rubel | ................. | B60R 7/02 |
| | | | | 296/37.6 |
| 2005/0156445 A1* | 7/2005 | Mains | ................. | B60N 3/001 |
| | | | | 296/37.16 |
| 2009/0200966 A1* | 8/2009 | Whitehouse | ............ | F21V 25/10 |
| | | | | 362/459 |

* cited by examiner

TRUCK AND AUTOMOTIVE CAB STORAGE BOX

CROSS REFERENCE TO RELATED APPLICATION

This application claims priority to and is a non-provisional of the previously filed U.S. Provisional Patent Application titled TRUCK AND AUTOMOTIVE CAB STORAGE BOX WITH TRAY, ANGLED COVER, AND UNDERNEATH LONG STORAGE AREA with an application filing date of Aug. 19, 2019 in the United States Patent and Trademark Office, with Application No. 62/888,639 by the same inventive entity. The entirety of Application No. 62/888,639 being incorporated herein by reference to provide continuity of disclosure.

FIELD OF THE INVENTION

This invention relates to a truck and automotive cab storage box, and more particularly, to a truck and automotive cab storage box that has a tray to secure items and an angled cover to allow access to the items only through the rear doors of the work truck or other vehicle.

BACKGROUND OF THE INVENTION

Many work trucks or other vehicles (hereinafter "truck/trucks" or "work truck/work trucks)") have a cab with a back seat and many people who drive work trucks use the back seat to carry tools, equipment, and other items (hereinafter "item/items") that are necessary for their jobs and the tasks or activities that they need to perform. If a work truck has a cab with seats, the seats are generally removed (or otherwise stored in a convenient manner) in order to provide additional space to store items. The extra space is beneficial in that the items can be stored in an area that is protected from the weather and in an area that can be locked to deter theft of the items. However, the area tends to be an open area without any means of securing the items in a desired place. Thus, when there is sudden accelerating, stopping, an accident, roll-over, or other movement of the truck, the items can slide which can cause damage to the items or truck, or possibly injure the driver or passengers. A truck and automotive cab storage box that can secure items in a safe position will be a useful invention.

Moreover, while the items may be necessary to perform the jobs, activities, and tasks, the items are not necessary during transportation to a job site or other destination. A driver who is looking for items, securing items, or otherwise taking their attention off of driving to focus on the items, poses a safety hazard to himself or herself and others on the road. A truck and automotive cab storage box that makes items inaccessible to the driver or other passengers during transport will be a useful invention.

Also, items may be stored on the top surfaces of boxes or containers that are used to store them during transport. The storing of items on the top of boxes and containers does not prevent the problem of the items or work truck being damaged or the driver or passengers injured in the event of sudden acceleration, stopping, an accident, a roll-over, or other sudden movement of the work truck. A truck and automotive cab storage box that makes it difficult, if not impossible, to store items on top of it will be a useful invention.

SUMMARY OF THE INVENTION

An objective of the present invention is the provision of a truck and automotive cab storage box that can secure items in a safe and desired position to reduce the potential for damage to the items or work truck or injury to the driver or passengers in the event of sudden acceleration, stopping, an accident, roll-over, or other movement of the truck.

Another objective of the present invention is the provision of a truck and automotive cab storage box that can secure items to make them inaccessible to the driver or other passengers during transport to a job site or other site.

A further objective of the present invention is the provision of a truck and automotive cab storage box that makes it difficult, if not impossible, to store items on top of it or around it.

A still further objective of the present invention is the provision of a truck and automotive cab storage box that creates a rigid and sturdy storage area while also providing boundaries for storage of items.

Also, an objective of the present invention is the provision of a method for using a truck and automotive cab storage box.

These and other objectives of the invention (which other objectives become clear by consideration of the specification, drawings, abstract, and claims as a whole) are met by the present invention.

BRIEF DESCRIPTION OF THE DRAWINGS

Throughout the figures of the drawings, where the same part appears in more than one figure of the drawings, the same number is applied thereto.

DETAILED DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Now adding FIG. 1, FIG. 2, FIG. 3, FIG. 4, FIG. 5, FIG. 6, FIG. 7, FIG. 8, and FIG. 9 to the consideration, the structure and function of truck and automotive cab storage box 100 (hereinafter "cab storage box") can be clearly seen. Cab storage box 100 in installed in the back seat of work truck 102. Cab storage box has first securing channel 110 and second securing channel 112 which rest against, are bolted, or otherwise securely affixed to an interior floor or other surface 104 of work truck 102. Apertures for receiving bolts, rather than bolts, may be depicted in the drawings. The cooperation between securing channels 110 and 112 and interior floor or other surface 104 secure cab storage box 100 to work truck 102.

A tray 114 is bolted or otherwise affixed to the top of securing channels 110 and 112. The tray has a series of sidewalls 116 extending from tray base 118. The sidewalls 116 and the tray base 118 form a containment area to store items.

Figure 1:
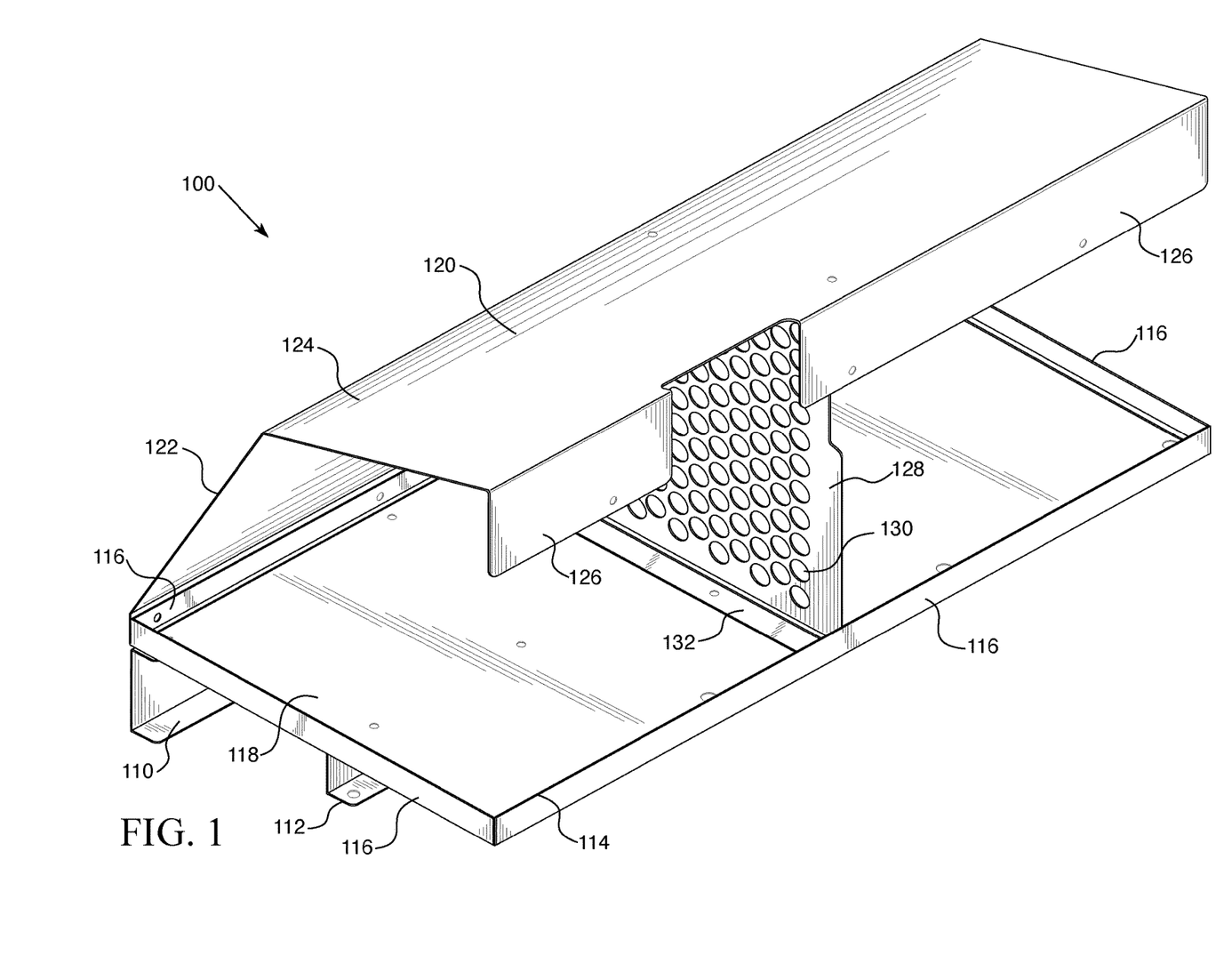
FIG. 1 depicts a perspective view of the truck and automotive cab storage box 100 of this invention.
Figure 2:
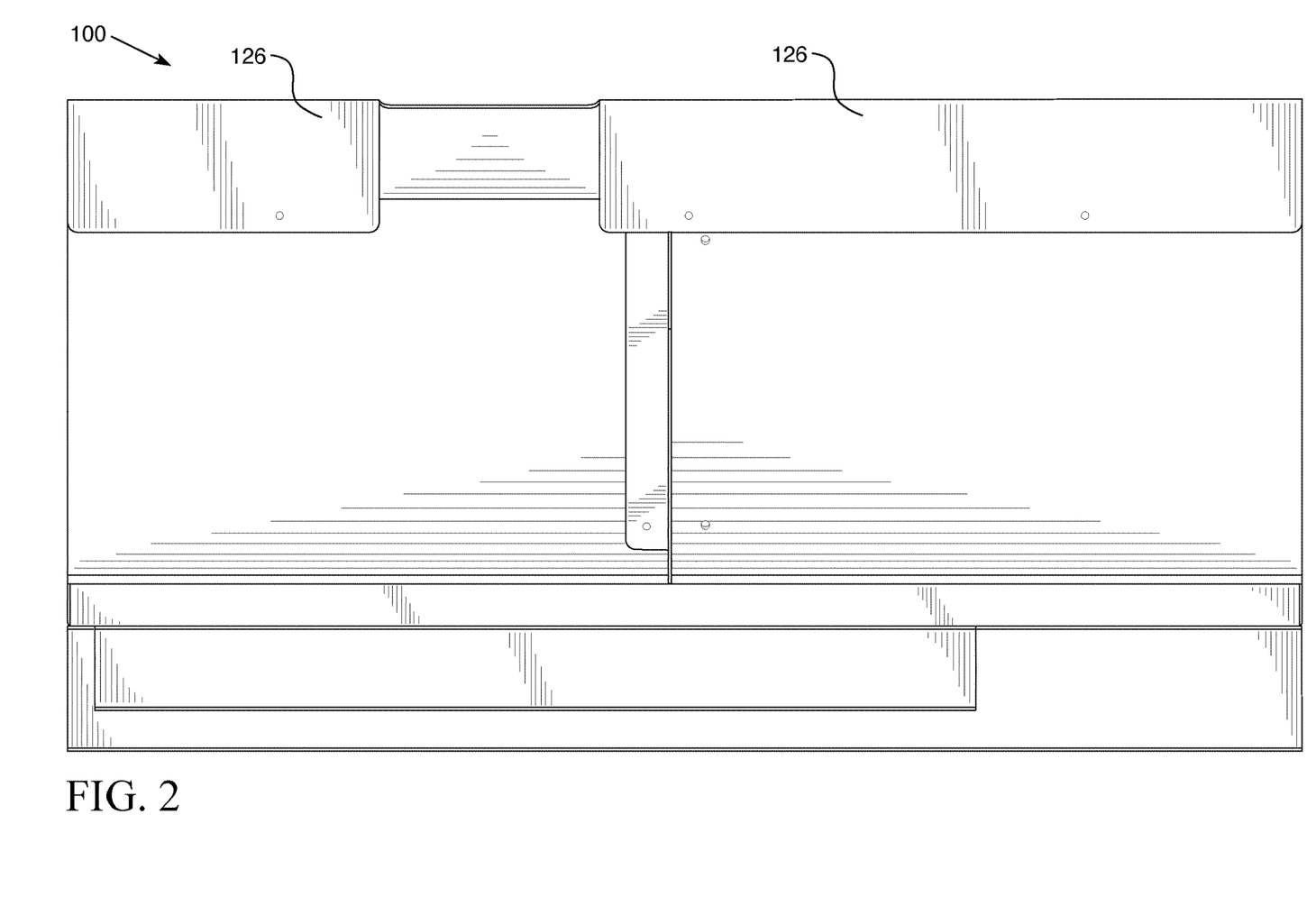
FIG. 2 depicts a rear elevational view of the truck and automotive cab storage box 100.
Figure 3:
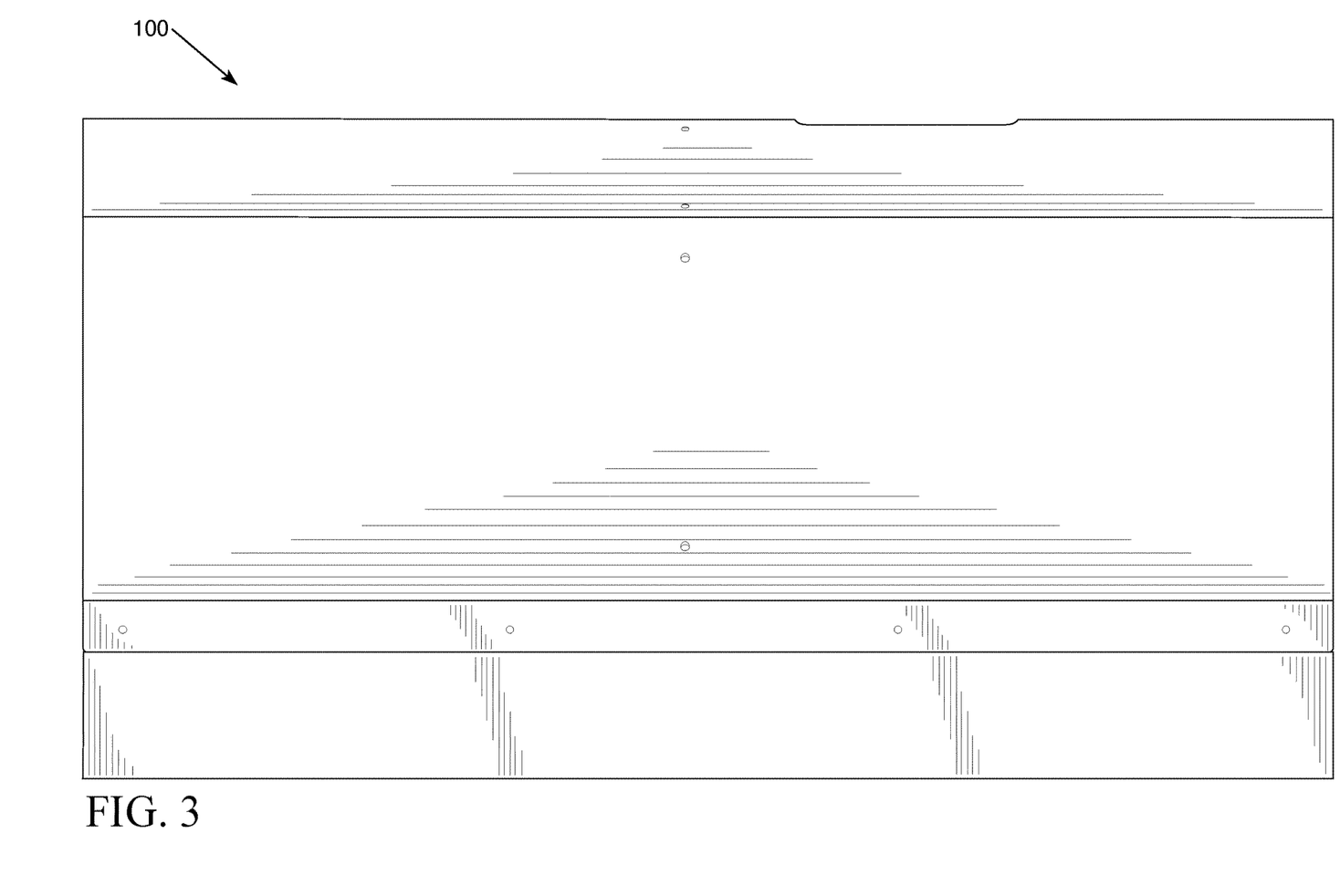
FIG. 3 depicts a front elevational view of the truck and automotive cab storage box 100.
Figure 4:
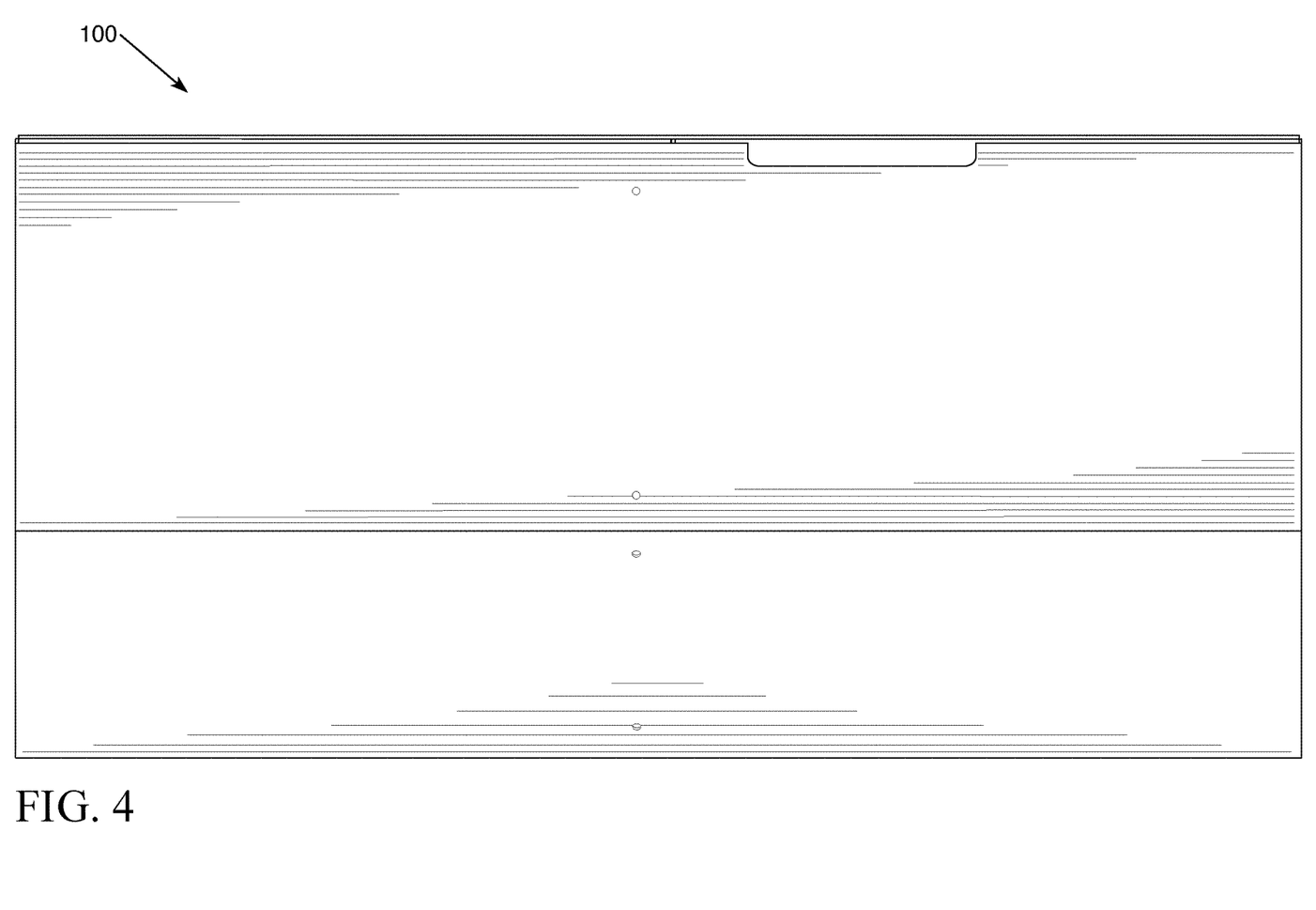
FIG. 4 depicts a top plan view of the truck and automotive cab storage box 100.
Figure 5:
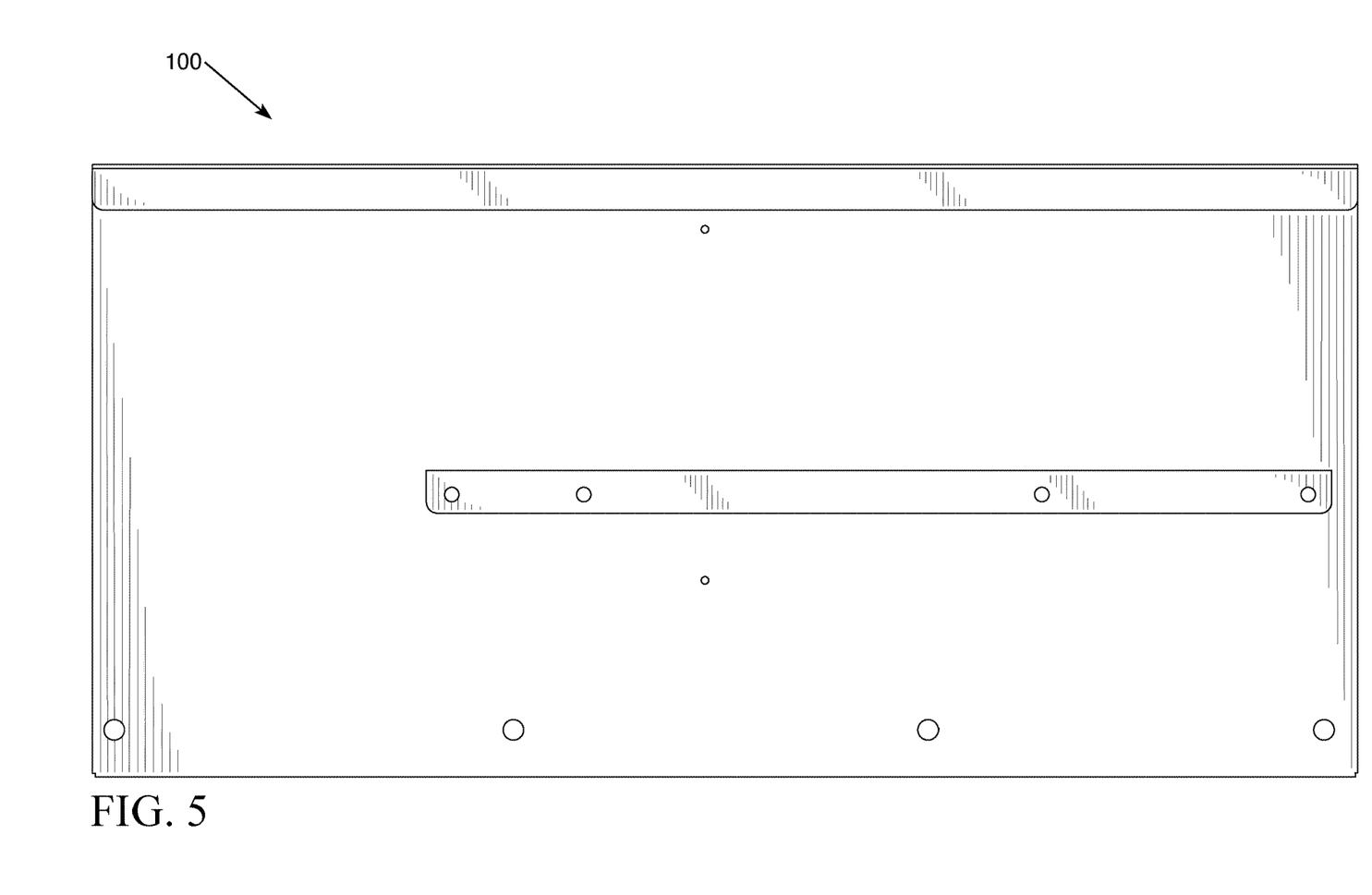
FIG. 5 depicts a bottom plan view of the truck and automotive cab storage box 100.
Figure 6:
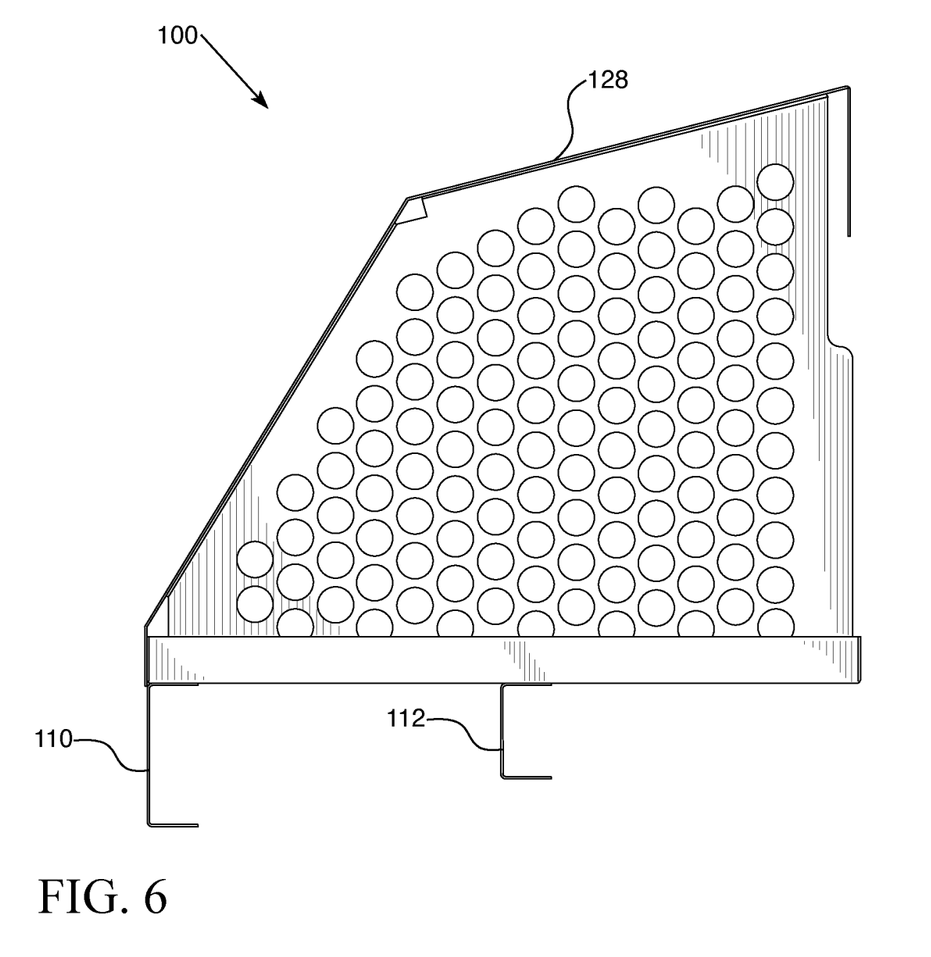
FIG. 6 depicts a right elevational view of the truck and automotive cab storage box 100.
Figure 7:
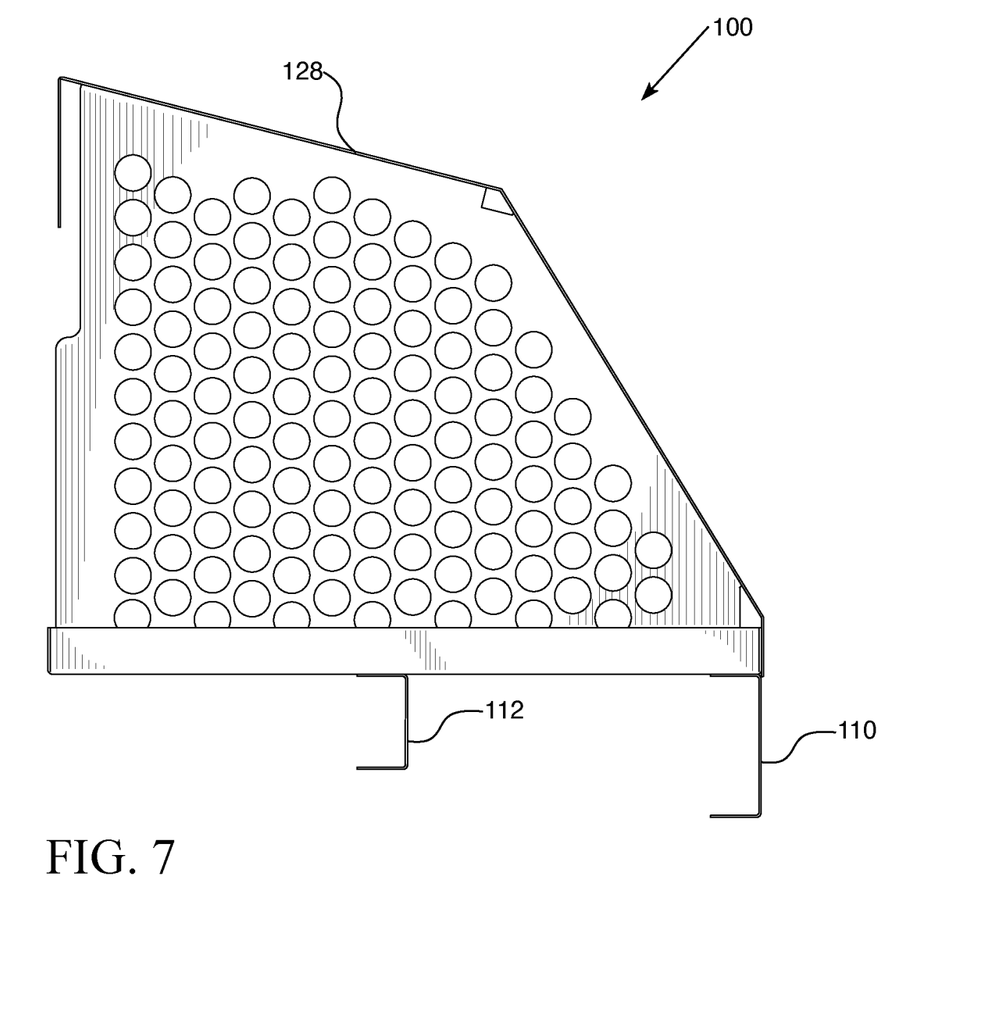
FIG. 7 depicts a left elevational view of the truck and automotive cab storage box 100.
Figure 8:
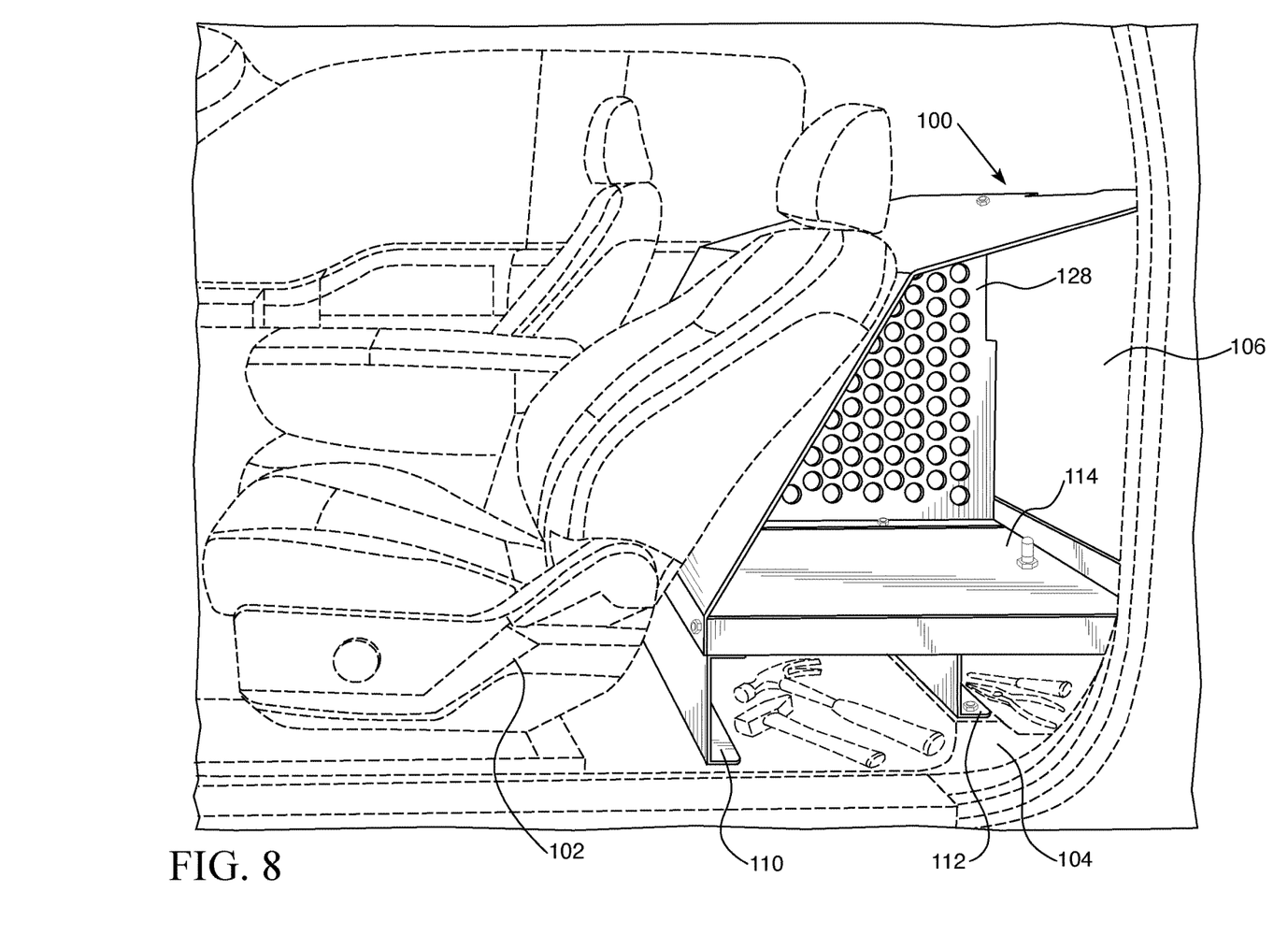
FIG. 8 depicts a perspective view of the truck and automotive cab storage box 100 installed in work truck 102 with the work truck 102 and tools depicted in phantom.

Also, items can be stored underneath tray 114 and above interior floor or other surface 104 and between one or both securing channels 110 and 112 (see FIG. 8). Securing channels 110 and 112 lift the tray bottom 138 of tray 114 up and off the surface of the interior floor or other surface 104 of the work truck 102. The interior space underneath of tray 114 can serve as an additional storage area for items and one or both of the securing channels 110 and 112 can act as boundaries within the storage area.

Cover 120 has lower cover 122 and upper cover 124. Lower cover 122 is bolted to sidewall 116. Upper cover 124 has flanges 126 which are bolted to a rear interior wall 106 or other surface of work truck 102 to securely attach cover 120 to work truck 102. Lower cover 122 and upper cover 124 form a barrier between the front seats of the work truck 102 and the items stored in or under cab storage box 100. This barrier makes it difficult or impossible to access items in or under cab storage box 100 without stopping work truck 102 and opening the rear passenger doors.

Upper cover 124 is preferably slanted or angled so that items cannot be stored on the top of the cab storage box 100. Also, cab storage box 100 preferably takes up all or almost all of the space in the backseat of work truck 102 so items cannot be placed or stored around cab storage box 100.

Upper cover 124 leaves an open area on each of the right side and the left side of cab storage box 100. This open area allows a user to insert items into, access items, and remove items from within or beneath tray 114 when the passenger doors of work truck 102 are opened.

Divider 128 is attached to the top side of tray base 118 and the bottom side 140 of upper cover 124 through a lower divider flange 132 and an upper divider flange 134. Lower divider flange 132 is bolted or otherwise securely affixed to tray base 118 of tray 114. Upper divider flange 134 is bolted or otherwise securely affixed to the bottom side 140 of upper cover 124.

Divider 128 creates two separate storage compartments within tray 114 and helps keep items from sliding across the entirety of tray 114 during transport.

It is optional to have a cab storage box 100 without a divider 128 and instead of the tray 114 being divided into two compartments, the tray 114 is one single compartment. Moreover, any suitable number of dividers 128 can be utilized and all such numbers are encompassed by this disclosure.

As can be seen from FIG. 8, once cab storage box 100 is placed in work truck 102, items inside or underneath of tray 114 can only be accessed by opening one or both of the back doors of work truck 102. Divider 128 has a series of apertures 130. Apertures 130 allow a person to look through divider 128 to see items that are stored on the other side. Apertures 130 also allow a user to hook items to divider 128.

In the depicted embodiment, there are two securing channels 110 and 112. However, any suitable number of securing channels can be utilized and all such numbers are encompassed by this disclosure. Also, bolts (or apertures for receiving bolts) are depicted as securing the components of cab storage box 100 to each other, the interior floor or other surface 104, and the rear interior wall or other surface 106. But, any suitable attachment means can be utilized and are encompassed by this disclosure including, but not limited to, welding and rivets.

Finally, the two securing channels 110 and 112 do not have to be securing channels and any suitable means of attaching cab storage box 100 to interior floor or other surface 104 can be utilized and are encompassed by this disclosure.

As an optional embodiment, one or more light emitting diode (hereinafter "LED") light strips 136 may be secured to cab storage box 100 in any desired position and any suitable number of LED light strips 136 may be utilized and all such numbers are encompassed by this disclosure. Also, any appropriate location for the LED light strips 136 may be utilized and is encompassed by this disclosure. LED light strips 136 provide extra light to aid in locating items stored in or under tray 114.

Figure 9:
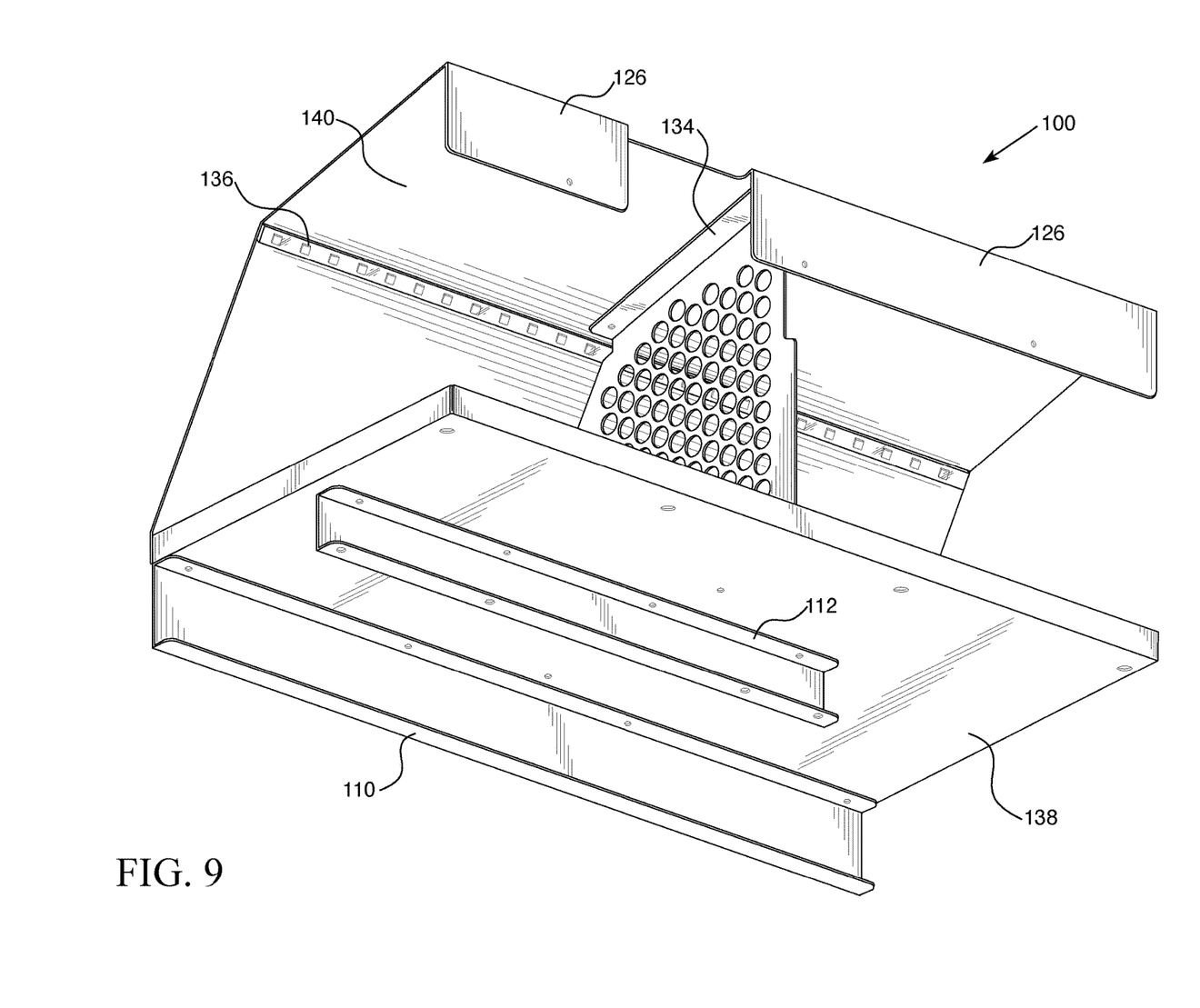
FIG. 9 depicts a perspective view of the truck and automotive cab storage box 100 of this invention.

It is preferred to place LED light strips 136 in the corner (the intersection of lower cover 122 and upper cover 124) to protect the light strips 136 from damage (see FIG. 9).

It is preferred, but not required, that cab storage box 100 have a dull or matte finish to keep the sun from causing a glare that may be disruptive to the driver.

Figure 10:
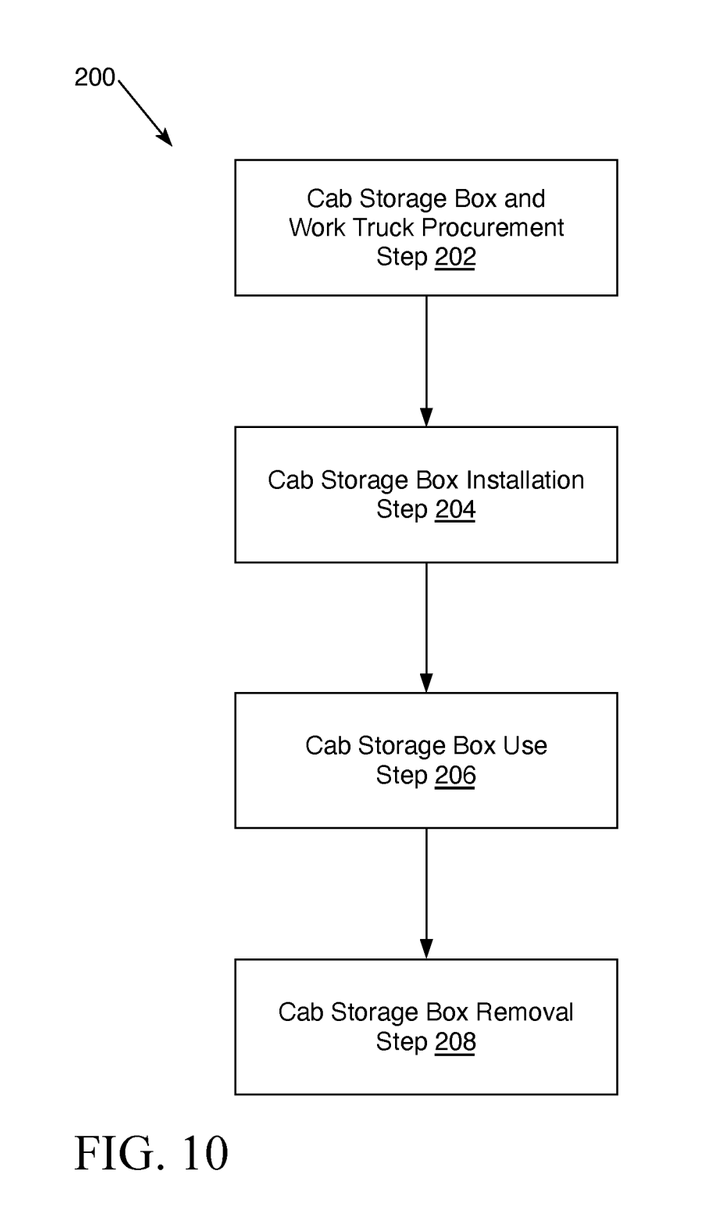
FIG. 10 depicts a block diagram of method 200 of this invention.

Now adding FIG. 10 to the consideration, method 200 of this invention can be clearly seen. As will be obvious to persons of ordinary skill in the art, the steps, or steps equivalent thereto, may be practiced in any reasonable order which will produce the desired result.

STEP 202 is the cab storage box and work truck procurement step. In this STEP 202, a cab storage box 100 and a work truck 102 are procured.

STEP 204 is the cab storage box installation step. In this STEP 204, cab storage box 100 is installed in work truck 102. Rear passenger seats or benches and other components may need to be removed from work truck 102 to install cab storage box 100.

Cab storage box 100 is positioned in the back seat of the cab of work truck 102 as desired. Securing channels 110 and 112 are rested against, bolted, or otherwise secured to interior floor or other surface 104. Flanges 126 are bolted or otherwise secured to rear interior wall or other surface 106.

It is noted that the securing channels can be secured to the interior floor or other surface 104 before or after flanges 126 are secured to rear interior wall or other surface 106.

STEP 206 is the cab storage box use step. In this STEP 206, cab storage box 100 is used as desired. Items are added to and stored within tray 114 or underneath tray 114 and between one or both channels 110 and 112. Items are removed, items are replaced, or new items added as desired. This STEP 206 is repeated as many times as desired.

As will be obvious, an item cannot be removed from within or underneath tray 114 unless it has been added to or underneath tray 114.

STEP 208 is the cab storage box removal step. In this optional STEP 208, cab storage box 100 is removed from work truck 102 if desired. Flanges 126 are detached from a rear interior wall or other surface 106. Securing channels 110 and 112 are detached from interior floor or other surface 104. Any passenger seating, benches, or other components that have been removed may be reinstalled as desired.

It is noted that flanges 126 can be removed from rear interior wall or other surface 106 before or after securing channels 110 or 112 are removed from interior floor or other surface 104.

This application—taken as a whole with the abstract, specification, claims, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure, and solely because of this disclosure, modification of this device and method can become clear to a person having ordinary skill in this particular art. Such modifications are clearly covered by this disclosure.

The invention claimed is:

1. A truck and automotive cab storage box comprising:
   a) a tray secured to a top surface of at least one securing channel, wherein the at least one securing channel rests against or is secured to an interior floor of a work truck or other vehicle, and further wherein at least one item can be secured in the tray;
   b) a cover secured to the tray;
   c) the cover having a lower cover and an upper cover, wherein the upper cover is angled in relation to the horizontal axis of the interior floor of the work truck or other vehicle;
   d) a divider separating the tray;
   e) the tray having four sidewalls, wherein the four sidewalls form a boundary around the perimeter of the tray;
   f) the divider having a lower divider flange to secure the divider to the tray and an upper divider flange to secure the divider to the upper cover; and
   g) at least one light emitting diode light strip being placed on an interior surface of the cover.

2. The truck and automotive cab storage box of claim 1 further comprising:
   a) the divider having a plurality of apertures, wherein the plurality of apertures allow visual access to a right side of the tray from a left side of the work truck or other vehicle or to a left side of the tray from a right side of the work truck or other vehicle.

3. The truck and automotive cab storage box of claim 2 further comprising:
   a) the lower cover being attached to the tray;
   b) the upper cover being attached to a rear interior wall of the work truck or other vehicle through at least one flange, wherein a void is created on both a left side and a right side of the truck and automotive cab storage box which allow access to an interior of the tray; and
   c) the upper cover and the lower cover forming a barrier between a front of the work truck or other vehicle and the interior of the tray.

4. The truck and automotive cab storage box of claim 3 further comprising:
   a) the at least one securing channel being two securing channels, wherein the two securing channels lift the tray up and off of the interior floor of the work truck or other vehicle, further wherein at least one item can be stored below the tray and in between the two securing channels; and
   b) one void being created on each of a left side and a right side of the truck and automotive cab storage box, wherein each of the left and right voids allow access to an interior of the tray.

5. The truck and automotive cab storage box of claim 4 further comprising the truck and automotive cab storage box having a dull or matte finish.

\* \* \* \* \*